US009982394B2

(12) United States Patent
Hokka et al.

(10) Patent No.: US 9,982,394 B2
(45) Date of Patent: May 29, 2018

(54) PAPERMAKING AGENT COMPOSITION AND METHOD FOR TREATING FIBRE STOCK

(71) Applicant: Kemira Oyj, Helsinki (FI)

(72) Inventors: Joonas Hokka, Espoo (FI); Matti Hietaniemi, Espoo (FI); Sacha Legrand, Helsinki (FI); Marco Polverari, St. Leonard (CA)

(73) Assignee: Kemira Oyj, Helsinki (FI)

( * ) Notice: Subject to any disclaimer, the term of this patent is extended or adjusted under 35 U.S.C. 154(b) by 0 days. days.

(21) Appl. No.: 15/113,115

(22) PCT Filed: Jan. 22, 2015

(86) PCT No.: PCT/FI2015/050037
§ 371 (c)(1),
(2) Date: Jul. 21, 2016

(87) PCT Pub. No.: WO2015/110703
PCT Pub. Date: Jul. 30, 2015

(65) Prior Publication Data
US 2017/0002518 A1    Jan. 5, 2017

(30) Foreign Application Priority Data
Jan. 22, 2014   (FI) .................................... 20145063

(51) Int. Cl.
| D21H 17/36 | (2006.01) |
| D21H 21/18 | (2006.01) |
| D21H 17/37 | (2006.01) |
| D21H 17/45 | (2006.01) |
| D21H 17/55 | (2006.01) |
| D21H 17/56 | (2006.01) |
| D21H 21/10 | (2006.01) |
| D21H 21/20 | (2006.01) |
| C09D 139/02 | (2006.01) |
| D21H 17/34 | (2006.01) |
| D21H 23/04 | (2006.01) |

(52) U.S. Cl.
CPC ........... *D21H 21/18* (2013.01); *C09D 139/02* (2013.01); *D21H 17/34* (2013.01); *D21H 17/36* (2013.01); *D21H 17/37* (2013.01); *D21H 17/375* (2013.01); *D21H 17/45* (2013.01); *D21H 17/55* (2013.01); *D21H 17/56* (2013.01); *D21H 21/10* (2013.01); *D21H 21/20* (2013.01); *D21H 23/04* (2013.01); *C08L 2201/54* (2013.01)

(58) Field of Classification Search
CPC ........ D21H 17/36; D21H 17/34; D21H 17/37; D21H 17/45; D21H 17/55; D21H 17/56; D21H 21/10; D21H 21/18; D21H 21/20; D21H 2/04
See application file for complete search history.

(56) References Cited

U.S. PATENT DOCUMENTS

| 6,132,558 | A  | 10/2000 | Dyllick-Brenzinger et al. |
| 2007/0000631 | A1 | 1/2007 | Grigoriev et al. |
| 2007/0181274 | A1 | 8/2007 | Esser |
| 2008/0000601 | A1 | 1/2008 | Leduc |
| 2008/0196852 | A1 | 8/2008 | Leduc |
| 2009/0314446 | A1 | 12/2009 | Lu et al. |

FOREIGN PATENT DOCUMENTS

| CN | 1145967 A | 3/1997 |
| CN | 101815728 A | 8/2010 |
| EP | 0331047 A1 | 9/1989 |
| EP | 0552702 A1 | 7/1993 |
| EP | 1727938 B1 | 3/2005 |
| WO | 2006071961 A1 | 7/2006 |

OTHER PUBLICATIONS

Search Report of Finnish Patent and Registration Office for priority application FI20145063 dated Aug. 21, 2014.
Chinese Patent Office, Search Report dated Oct. 10, 2017, CN application No. 201580005441.3.
European Patent Office, Communication dated Mar. 22, 2018, European Patent Application No. 15703095.8.

*Primary Examiner* — Mark Halpern
(74) *Attorney, Agent, or Firm* — Berggren LLP

(57) ABSTRACT

The invention relates to a papermaking agent composition, preferably in powder form, which comprises a water-soluble polymer, which comprises 21-30 mol-% of vinylamine units and has an average molecular weight of at least 1 000 000 Da. The invention relates also to a method for treating of fiber stock in manufacture of paper, board or the like, where a thick fiber stock is obtained, it is diluted to a thin fiber stock having a consistency <3% by addition of water, and the thin fiber stock is drained and a continuous fibrous web is formed. The papermaking agent composition is added to the thick fiber stock or to the thin fiber.

12 Claims, 2 Drawing Sheets

US 9,982,394 B2

PAPERMAKING AGENT COMPOSITION AND METHOD FOR TREATING FIBRE STOCK

This application is a 371 of PCT/FI2015/050037 filed 22 Jan. 2015.

FIELD OF THE INVENTION

The present invention relates to a papermaking agent composition and method for treating fibre stock according to the preambles of the enclosed claims.

TECHNICAL FIELD

One object in the manufacture of packaging grade paper and board is the cost efficiency. This object may be achieved by reducing the basis weight of produced paper or board, increasing the filler content, using cheaper recycled raw materials and developing production output. These cost reducing actions increase challenges encountered in wet end retention of paper and board machines, and may cause problems in achieving required strength properties of the final paper and board. Different chemical additives and agents may be added to the fibre stock for improving the drainage and retention of the formed web as well as the strength properties of the final paper or board.

BACKGROUND OF THE INVENTION

Polyvinylamine polymers comprise primary amine groups attached to the polymer structure or linear polymer backbone. The primary amine groups make the polymers highly reactive, and they are used in numerous applications, also in papermaking, because of their charge density, reactivity and water solubility. However, polyvinylamine polymers having high molecular weight may be too reactive, which may lead to overflocculation and problems in dewatering and retention in the wet-end of a paper machine or board machine.

In paper and boardmaking the use of inexpensive fibre sources, such as old corrugated containerboard (OCC) has been increasing over the past decades. OCC comprises mainly used recycled unbleached or bleached kraft pulp fibres, hardwood semi-chemical pulp fibres and/or grass pulp fibres. OCC pulp may be used especially for manufacture of liner and fluting grades, often together with mixed waste recycled paper grades. Consequently chemical additives, which are suitable for use with pulps comprising recycled fibres, are in constant demand.

EP 1 727 938 discloses a process for production of paper, board and cardboard in presence of polymers which comprise vinylamine units. The used polymers have an average molar mass of at least 1 million and a degree of hydrolysis of from 1 to 20 mol-%. The polymers are metered to high consistency stock which is diluted and drained. The stock may contain coated broke and disturbing substances originating from the coating. However, there is a still need for papermaking agent compositions which are especially suitable for improving retention and/or drainage of fibre stock comprising recycled fibres, especially fibres from old corrugated cardboard (OCC). Further, it would be advantageous if the chemicals used for retention and/or drainage would have a positive effect on the properties of the produced paper, e.g. burst strength, short span compression (SCT) and/or tensile strength.

One problem has been that the polyvinylamine polymers may neutralize all or most of the anionic charges in the short loop white water circulation of the paper or board machine. This may lead to the overcationisation of the fibre stock, which results in foaming, decreased dewatering effectivity and decreased strength properties in the final paper or board.

BRIEF DESCRIPTION OF THE INVENTION

The object of the present invention is to minimize or even eliminate the disadvantages existing in the prior art.

One object of the present invention is to provide a papermaking agent, with which the drainage and/or retention in the wet-end of a paper or board machine may be improved, and simultaneously at least one strength property, such as burst strength, short span compression (SCT) and/or tensile strength, of the produced paper may be increased.

A further object is to provide a method for treating fibre stock, especially fibre stock comprising recycled fibres, in order to improve the dewatering in the wet-end of a paper or board machine and simultaneously increase at least one strength property of the produced paper.

Typical papermaking agent in powder form composition according to the present invention, preferably, comprises at least 40 weight-% of a water-soluble polymer, calculated from the total weight of the dry composition, which water-soluble polymer comprises 21-30 mol-% of vinylamine units and has an average molecular weight of at least 1 000 000 Da.

Typical method for treating fibre stock according to the present invention in manufacture of paper, board or the like, for increasing the dewatering of the stock and at least one strength property of produced fibrous web, comprises
- obtaining a thick fibre stock,
- diluting the thick fibre stock to a thin fibre stock having a consistency <3% by addition of water,
- draining the thin fibre stock and forming a continuous fibrous web,
- adding to the thick fibre stock or to the thin fibre stock a papermaking agent composition which comprises a water-soluble polymer, comprising 21-39 mol-% of vinylamine units and having an average molecular weight of at least 1 000 000 Da.

Now it has been surprisingly found out that by carefully selecting and optimising the amount vinylamine units and the average molecular weight of the water-soluble polymer it is possible to obtain a papermaking agent composition, which increases the drainage in the wet-end of the paper machine or board machine, especially when the used fibre raw materials comprise recycled fibres. It was unexpectedly found that simultaneously at least one strength property of the final paper can be significantly increased. It was surprisingly realised that when a papermaking agent composition comprising the water-soluble polymer having 21-30 weight-% of vinylamine units and with an average molecular weight of at least 1 000 000 Da is added to the thick or thin stock, the drainage and optionally retention of the stock is notably increasing. At the same time an increase in at least one strength property, e.g. burst strength, short span compression (SCT) strength and/or tensile strength, of the produced paper or board is observed. Furthermore, it was surprisingly found that the problems relating to the overcationisation in the short loop white water were drastically minimised or even totally eliminated when the papermaking chemical according to the present invention were used in making of paper or board.

The term "water-soluble polymer" is understood in the context of the present application as a polymer, which is fully soluble and miscible with water. When mixed with excess of water, the polymer is fully dissolved and the obtained polymer solution is essentially free from discrete polymer particles and no phase separation can be observed. Excess of water means that the obtained polymer solution is not a saturated solution.

In the present context the terms "drainage" and "dewatering" are used synonymously and they are fully interchangeable. These terms describe the effectivity of the water removal from the formed fibrous web after the headbox in the forming section.

Molecular weight of the water-soluble polymer comprising vinylamine units is determined by using HPLC size exclusion chromatography, polyethylene oxide (PEO) as reference.

DETAILED DESCRIPTION OF THE INVENTION

Figure 1:
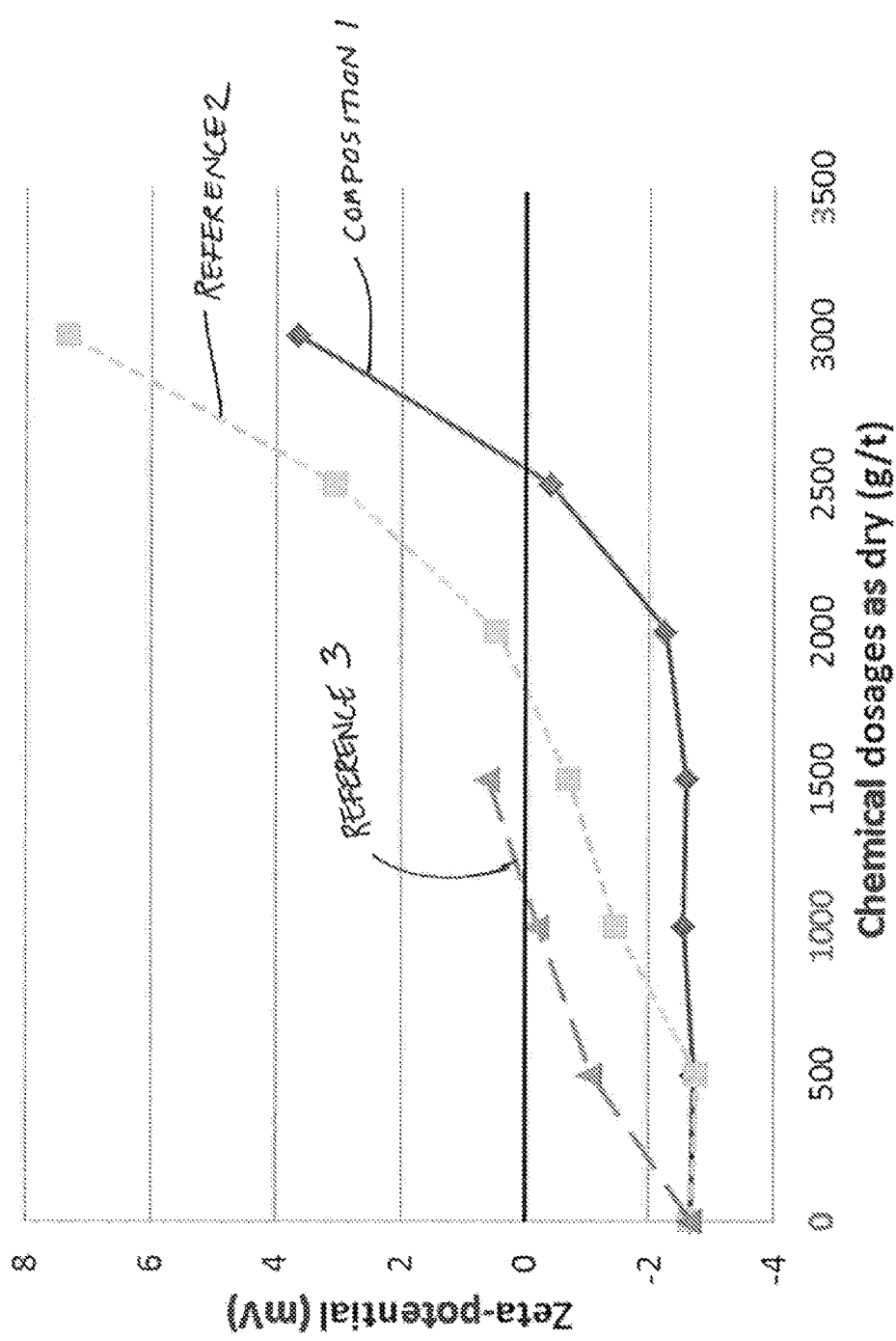
FIG. 1: Zeta potential vs. Chemical dosages as dry.

According to one embodiment the papermaking agent composition, preferably in powder form, comprises a water-soluble polymer, which comprises 21-39 mol-% of vinylamine units and has an average molecular weight of at least 1 000 000 Da.

The water-soluble polymer may be a linear copolymer of vinylamine and N-vinylformamide or a linear copolymer of vinylamine and vinylalcohol. Further, the water-soluble polymer may even be a linear homopolymer of vinylamine. According to one preferred embodiment the water-soluble polymer is a copolymer, which consists solely of N-vinylformamide and vinylamine or it is a copolymer, which consists solely of vinylamine and vinylalcohol. Especially when the papermaking agent composition is used as drainage and/or retention aid for fibre stocks comprising recycled fibres from old corrugated cardboard, the copolymers are preferred.

According to one embodiment of the invention the water-soluble polymer comprises 21-30 mol-%, preferably 21-29 mol-%, more preferably 21.5-25 mol-%, even more preferably 21.5-23.5 mol-%, of vinylamine units. The amount of vinylamine units is selected in order to optimise the retention and dewatering effects, together with the strength properties of the produced paper or board. Especially when OCC pulp is used for making of board or paper, the vinylamine units provide improved short span compression (SCT) and/or burst strength of paper and effective fixation to the fibres.

The amount of water-soluble polymer in papermaking agent composition may be at least 50 weight-%, preferably at least 70 weight-%, more preferably at least 75 weight-%, even more preferably at least 80 weight-%, sometimes even at least 85 weight-%, calculated from the total weight of the dry composition. According to one embodiment of the invention the amount of water-soluble polymer in dry powderous papermaking agent composition may be 70-97 weight-%, more preferably 85-95 weight-%, calculated from the total weight of the composition. According to one advantageous embodiment of the invention the papermaking agent composition is in form of dry powder. The dry powder is easy to transport and store. The water-soluble polymer forms the main component of the dry powderous papermaking agent composition. When the papermaking agent composition is in form of solid powder or particulate material, the amount of water-soluble polymer in the composition is typically >70 weight-%, preferably 70-95 weight-%, calculated from the total weight of the composition.

The papermaking agent composition may be dissolved into water in order to obtain a papermaking agent composition in form of an aqueous solution, which has a viscosity of >1000 mPas, preferably 1500-20 000 mPas, more preferably 2000-15 000 mPas, measured at 4 weight-% solution and 35 mS/cm conductivity. The conductivity of the papermaking agent composition in solution form can be adjusted e.g. by using NaCl.

When the papermaking agent composition is dissolved in water and is ready for use, it may be in form of an aqueous solution, where the amount of water-soluble polymer in the aqueous solution is typically 30-60 weight-%, preferably 35-55 weight-%, calculated from the total weight of the solution.

The papermaking agent composition typically contains salt, i.e. sodium formate, which is formed as a by-product in hydrolysis of N-vinylformamide with sodium hydroxide. The total amount of sodium formate may be <40 weight-%, preferably <20 weight-%, more preferably <10 weight-%. Preferably sodium formate content is at least 2 weight-%.

The papermaking agent composition may also comprise additives for solubility, such as inorganic salts, acids, and/or anticaking agents. For example, the papermaking agent composition in powder form may comprise one or several suitable salts, such as sodium chloride or urea, for improving the solubility of the composition, and/or anticaking agent(s) for improving the storage stability of the composition. The composition may comprise acid(s), which is/are used for adjusting the pH of the composition and which may preferably be as hydrosalt form with polyvinylamine. Suitable acid is, for example, hydrochlorine acid or citric acid. The total amount of solubility additives and/or anticaking agents is <10 weight-%, preferably <5 weight-%, more preferably <2 weight-%, calculated from the total weight of the dry composition.

Preferably, the papermaking agent composition may comprise <0.2 weight-%, preferably <0.1 weight-%, of surfactant, calculated from total weight of the composition. The surfactant may be polyethylene glycol. Alternatively, surfactant may be a two-block copolymer surfactant or three-block copolymer surfactant, comprising both hydrophilic and hydrophobic ends. According to one embodiment the papermaking agent composition is essentially free from said surfactants or any surfactants. It is advantageous if the amount of surfactant is kept as low as possible, or even non-existent, because it has been observed that the strength properties of the produced paper or board may be then even further increased.

The papermaking agent composition may be added to the thick fibre stock, especially when the strength properties, such as short span compression (SCT) strength, burst strength and/or tensile strength, of the produced paper or board are optimised, i.e. increased. Thick fibre stock is here understood as a fibrous stock or furnish, which has consistency of at least 2%, preferably at least 2.5%, more preferably at least 3%. According to one embodiment of the invention the papermaking agent composition is added to the fibre thick stock and the fibre thick stock is then diluted with short loop white water of the paper or board machine before the web formation. The addition to the fibre thick stock may be advantageous because the papermaking agent comes more easily in contact with the fibres and is adsorbed on them. In this way the strength properties of the paper web can be effectively increased. In this context the term "short loop" is synonymous with the term "short circulation". Short loop denotes the flow loop from the wire pit to the machine headbox and back to the wire pit. The short loop includes all pumps, cleaning systems, etc. located in the flow loop between the wire pit and the headbox.

Alternatively, the papermaking agent composition may be added to the thin fibre stock after the last shear stages and before the headbox of the paper machine or board machine. Preferably the papermaking agent composition is added after the machine screen and before the headbox. Thin fibre stock is here understood as a fibrous stock or furnish, which has consistency of <3%, preferably less than 2.5%, more preferably less than 2%. The addition to the thin fibre stock may be advantageous when the dewatering, and optionally the retention of the filler, need to be improved. In the thin fibre stock the papermaking agent comes more easily in contact with the inorganic filler material in the stock. In this way the drainage and/or retention of the paper web comprising filler material can be effectively improved.

According to one embodiment the papermaking agent composition may be added in the papermaking or boardmaking process both to the thick stock and to the thin stock.

According to one embodiment of the invention it is possible to add cationic copolymer of acrylamide to the fibre stock, preferably sequentially, alternatively simultaneously, with the papermaking agent composition comprising water-soluble polymer, which comprises vinylamine units. The cationic copolymer of acrylamide enhances retention of stock fines and filler, while the papermaking agent composition takes care of the charge control of the stock. Cationic copolymer of acrylamide may be obtained by polymerizing acrylamide with a cationic monomer or by polymerizing methacrylamide with a cationic monomer. The cationic monomer may be selected from the group consisting methacryloyloxyethyl-trimethyl ammonium chloride, acryloyloxyethyltrimethyl ammonium chloride, 3-(methacrylamido) propyltrimethyl ammonium chloride, 3-(acryloylamido) propyltrimethyl ammonium chloride, diallyldimethyl ammonium chloride, dimethylaminoethyl acrylate, dimethylaminoethyl methacrylate, dimethylaminopropylacrylamide, dimethylaminopropylmethacrylamide, and similar monomers. According to one preferred embodiment of the invention cationic copolymer of acrylamide is a copolymer of acrylamide or methacrylamide with (meth) acryloyloxyethyltrimethyl ammonium chloride. Cationic copolymer of acrylamide may also contain other monomers, as long as its net charge is cationic and it has an acrylamide/methacrylamide backbone. An acrylamide or methacrylamide based polymer may also be treated after the polymerisation to render it cationic, for example, by using Hofmann or Mannich reactions. Cationic copolymer of acrylamide may have a molecular weight (MW) in the range of 5 000 000-20 000 000 g/mol. According to one embodiment of the present invention cationic polyacrylamide may have an average molecular weight (MW) in the range of 5 000 000-15 000 000 g/mol, preferably 7 000 000-13 000 000 g/mol, more preferably 8 000 000-10 000 000 g/mol. The retention or flocculation effect may be optimised by suitable selection of the molecular weight of the cationic copolymer of the acrylamide. The retention or flocculation effect normally increases with the increasing molecular weight of the acrylamide copolymer.

According to one embodiment of the invention inorganic anionic microparticles may be added to the fibre stock, preferably after the addition of the papermaking agent composition comprising polymer comprising vinylamine units. Inorganic microparticles may be bentonite particles or colloidal silica particles or any of their mixture. Typically the average particle size of bentonite particles is 50-200 nm, preferably 75-125 nm. Typically the average particle size of colloidal silica particles is 3-20 nm, preferably 5-20 nm, more preferably 5-15 nm, sometimes 7.5-15 nm. Colloidal silica is here understood as a stable aqueous suspension of amorphous non-porous silica particles. Individual colloidal silica particles are typically spherical or nearly spherical. According to one preferred embodiment of the invention anionic colloidal silica is used. Colloidal silica is prepared by starting from an alkali silicate, typically sodium silicate suspension, and allowing the silica to polymerise and form particles. Colloidal silica should not be mixed up with fumed silica, which is pyrogenically produced e.g. by combustion of silicon tetrachloride.

According to one embodiment it is possible to add inorganic anionic microparticles to the fibre stock before the addition of the papermaking agent composition.

According to another embodiment of the invention anionic copolymer of acrylamide may be added to the fibre stock, preferably after the addition of the papermaking agent composition comprising water-soluble polymer, which comprises vinylamine units. Anionic copolymer of acrylamide may be added in form of a solution or in a form of crosslinked polymer microparticle. Polymer microparticles are obtained by polymerisation of the monomer in a coagulant matrix. Polymer microparticles have typically an average particle size of 0.75-1.2 μm. Anionic copolymer of acrylamide may be used together with inorganic anionic microparticles described above.

Anionic copolymer of acrylamide in form of a solution that is suitable for use together with the papermaking agent composition, may be formed by copolymerising acrylamide together with unsaturated carboxylic acid monomers, such as (meth)acrylic acid, maleic acid, crotonic acid or itaconic acid. Also other anionic monomers, such as vinylsulphonic acid, 2-acrylamide-2-methylpropanesulfonic acid, styrene sulfonic acid, vinyl phosphonic acid or ethylene glycol methacrylate phosphate, may be included. It is also possible that noncharged monomers may be included, as long as the net charge of the formed polymer is anionic and the polymer has an acrylamide/methacrylamide backbone. Anionic copolymer of acrylamide may be linear or crosslinked and have anionic charge 20-80 mol-%, sometimes 30-80 mol-%. Anionic copolymers of acrylamide may have an intrisinc viscosity value of 1-6 dl/g, preferably 2-5 dl/g, more preferably 3-5 dl/g. Intrinsic viscosity values are measured in a known manner in 1N NaCl at 25° C. by using an Ubbelohde capillary viscometer. The capillary selected is appropriate, and in the measurements of this application an Ubbelohde capillary viscometer with constant K=0.005228 was used.

Anionic copolymer of acrylamide may be added 10-400 g/ton produced paper, calculated as active polymer.

According to one preferred embodiment of the present invention the papermaking agent composition is used for treating fibre stock, which comprises fibres originating from recycled paper, old corrugated containerboard (OCC), unbleached kraft pulp, neutral sulphite semi chemical (NCCS) pulp and/or mechanical pulp. OCC preferably comprises recycled unbleached kraft pulp fibres, and it is used especially for manufacture of liner and fluting grades, often together with mixed waste recycled paper grades. The fibres in the stock may comprise at least 80% recycled fibres, preferably at least 90% recycled fibres, sometimes even 100% recycled fibres. Recycled fibres originate from old corrugated cardboard and/or mixed paper grades. Preferably a mixture of old corrugated cardboard and mixed paper grades is used for recycled fibres. The papermaking agent composition is especially suitable for fibre thick stock having a zeta-potential value −15--−1 mV, preferably −10--−1, more preferably −7--−1 mV, before the addition of the papermaking agent composition to the fibre stock.

After the addition of the papermaking composition comprising water-soluble polymer, which comprises vinylamine units, to the fibre stock the zeta-potential of the fibre stock is <0 mV, preferably −10--−1, more preferably −8--−1 mV.

After the addition of the papermaking agent composition and possible other additives the charge density of the fibre stock in the headbox is at the most 300 μeq/l, preferably 200 μeq/l, more preferably 150 μeq/l, higher than the charge density of the fibre thick stock before the addition, when the amount of added water-soluble polymer has been at least 400 g/ton produced paper, given as active agent.

Papermaking agent composition may be added to the thick fibre stock in such amount of that the amount of the said water-soluble polymer is 50--1500 g/ton produced paper, preferably 100-900 g/ton produced paper. more preferably at least 400-800 g/ton produced paper.

For example, in one embodiment of the invention the fibre stock, which has been treated with the papermaking agent composition, as described above, is used for making a product, which is paper, board or the like having a base paper ash content of >10%, preferably >15%, more preferably 15-25%, even more preferably 16-25%. Standard ISO 1762, temperature 525° C., is used for ash content measurements.

EXPERIMENTAL

Preparation of Water-Soluble Polymer

N-vinylformamide, NVF, is used as a precursor for the polymerization of poly(N-vinylformamide), PNVF. In the following Examples the polyvinylamines have been synthetized by using solid N-vinylformamide.

Polyvinylamine, PVAm, is produced by the hydrolysis of PNVF in the presence of basic aqueous NaOH solution. The hydrolysis via basic solution produces a polymer backbone having free amine functional groups and sodium formate salt as a by-product. The base hydrolysis occurs fairly easily because of the attack of strong nucleophile on the amide group in the basic solution.

Used Test Chemicals and Methods in the Examples

Following chemicals are used in the Examples:

C-PAM: cationic copolymer of acrylamide, molecular weight about 6,000,000 g/mol, charge 10 mol-%

A-PAM: crosslinked anionic copolymer of acrylamide, molecular weight about 3,000,000 g/mol, charge −60 mol-%

Bentonite: Altonite SF (Kemira Oyj), used as 3 weight-% slurry

Colloidal silica: average particle size 5 nm

Papermaking agent compositions comprising water-soluble N-vinylformamide-vinylamine copolymers that are used in the following Examples are defined in annexed Table 1. Viscosity values in Table 1 are measured by using a Brookfield viscometer, the papermaking agent being 4 weight-% solution at 35 mS/cm conductivity (adjusted by NaCl). The level of hydrolysis of the water-soluble copolymer is given mol-%. The percentage of hydrolysis degree gives the amount of monomers having amine functionality in their polymer chain.

The papermaking agent compositions 1-3 according to the invention are in form of dry powderous products. Employed powderous compositions are diluted to suitable concentration before the addition to the test pulp slurry. The dilutions are conducted to facilitate the dosage volumes of the test chemicals.

All chemical dosages in the Examples are calculated as dry product.

Dynamic Drainage Analyzer, DDA

A Dynamic Drainage Analyzer, DDA, (AB Akribi Kemikonsulter, Sweden) was used to measure drainage and retention.

DDA's vacuum and stirrer were calibrated and necessary adjustments to the settings were made. DDA was connected to a computer for measuring the time between an application of vacuum and the vacuum break point. A change of the vacuum expresses the forming time of a wet fibre web until air breaks through the thickening web indicating the drainage time. A drainage time limit was set to 30 seconds for the measurements.

In drainage measurements, 500 ml of the stock sample was measured into the reaction jar. The drainage test was performed by mixing the sample stock with the stirrer at 1200 rpm for 30 seconds while the chemicals to be tested were added in predetermined order. Test chemical addition times are indicated in result tables as negative time before the start of the drainage.

In retention measurements, 500 ml of the stock sample was measured into the reaction jar, and a wire with 0.25 mm openings and a 300 mbar vacuum were used.

Abbreviations used in the Examples: LF=long fibre; SF=short fibre; CF=clear filtrate Example 1: Papermaking Agent Composition with Anionic Copolymer of Acrylamide (A-PAM)

Commercial Central European Old Corrugated Container (OCC) stock from Germany was used as raw material in Example 1. Stock had been separated into long fibre (LF) fraction and short fibre (SF) fraction by the screen fractionation process already at the papermill. Both stock fractions were characterised, results are shown in annexed Table 2. Clear filtrate and thin stock were also obtained from a papermill, and they were characterised, results are shown in Table 2.

Both LF- and SF-fractions were tested and analysed separately, and all the results in Example 1 are given as an arithmetic average of individual results obtained with LF-fraction and SF-fraction.

The dilution ratio for the DDA measurements was as follows: two parts of OCC fibre stock, either LF- or SF-fraction, and one part of thin stock. Sample was diluted to consistency of 2.6 g/l with the clear filtrate and adjusted to room temperature of +23° C. The ash content of 16.9% was achieved due to the high filler content of the added thin stock.

Papermaking agent compositions and anionic copolymer of acrylamide are as defined above. Drainage and retention of each stock sample was measured as described earlier by using the DDA, and the used chemicals were added sequentially into the stock sample during mixing. The results of Example 1 are shown in annexed Table 3.

It can be seen from Table 3 that Composition 1 comprising water-soluble polyvinylamine having hydrolysis degree of 21% gives faster drainage and higher first-pass retention (FPR) results than reference compositions comprising polyvinylamines with higher hydrolysis degree.

Example 2: Papermaking Agent Compositions with Cationic Copolymer of Acrylamide (C-PAM) and Bentonite Papermaking agent compositions, cationic copolymer of acrylamide (C-PAM), as well as bentonite are as defined above. Same stock raw material is used as in Example 1. The results are given as an arithmetic average of individual results obtained with LF-fraction and SF-fraction.

Drainage and retention of each stock sample was measured as described above by using the DDA, and the tested compositions and chemicals were added sequentially into the stock sample during mixing. The drainage and retention results of Example 2, which uses a multicomponent system comprising papermaking agent composition, C-PAM and bentonite are shown in annexed Table 4.

It can be seen from Table 4 that when used together with C-PAM and bentonite, Composition 1 comprising water-soluble polyvinylamine having hydrolysis degree of 21% gives faster drainage and higher first-pass retention (FPR) results than reference compositions comprising polyvinylamines with higher hydrolysis degree.

Example 3: Drainage Test with Recirculated Filtrate

The stock sample was prepared by using the same long fibre (LF) fraction and thin stock as in Example 1, as well as tap water. Conductivity of tap water was adjusted to the same level as in the thin stock by adding NaCl. The same dilution ratio of the test pulp was selected according to the drainage of the Test #1 of Example 1.

Drainage tests were performed as described above by using the Dynamic Drainage Analyzer, and DDA filtrate was used as dilution water for the sample stock. Sample stock consistency was 6.6 g/l and the ash content was 15%. The configuration and settings of the DDA equipment corresponded with the Example 1. DDA filtrate was recirculated as dilution water in order to simulate the short circulation of a paper machine. The filtrate was recirculated seven times. The filtrate charge was analyzed from every other DDA filtrate by using Mütek PCD 03. The results of Example 3 are presented in annexed Table 5.

After seven circulations the system achieved relatively stable charge conditions. From Table 5 it can be seen that Compositions 1 and 3, comprising water-soluble polyvinylamine having hydrolysis degree of 21% and 35%, respectively, were much more effective in drainage than the reference compositions, comprising polyvinylamine having hydrolysis degree of 55% and 90%, respectively.

Example 4: Papermaking Agent Composition with Anionic Copolymer of Acrylamide (A-PAM)

Commercial Central European Old Corrugated Container (OCC) stock was used as raw material in Example 4. For preparation of samples the following dilution ratio was chosen: one part of OCC stock and two parts of white water. White water was obtained from a papermill. Each sample was diluted to consistency of 5.4 g/l by using conductivity adjusted tap water.

Properties of OCC stock and white water are given in annexed Table 6.

Drainage was measured by using the DDA, as described above. The drainage results are shown in annexed Table 7. It can be seen from Table 7 that Compositions comprising polyvinylamine having hydrolysis degree of 21%, 23 and 35% give faster, i.e. better, drainage than the reference compositions comprising polyvinylamines with higher hydrolysis degree of 40%, 55% and 90%. The same effect is seen when the compositions are used together with anionic copolymer of acrylamide.

Example 5: Effect on Zeta Potential

Test fibre slurry was prepared by wet disintegrating dry testliner and fluting sheets based on recycled fibres by using a Lorentzen & Wettre Pulp Disintegrator, according to standard ISO 5263:1995. The dry testliner and fluting sheets were cut to pieces having size of 2.5×2.5 cm and weighted to oven-dry mass of 60 g. The cut and weighed testliner and fluting sheets, in weight ratio 1:1, were dissolved in the white water, temperature 50° C., dissolution time 10 minutes. The volume of the obtained disintegrated slurry was 2700 ml and the rotation of the propeller was adjusted to 50 000 rotations. The test slurry was cooled to room temperature in an ice cube bath prior to the zeta potential measurements.

The disintegrated slurry volume in zeta potential determination was 500 ml. The compositions were added under mixing, mixing speed 250 rpm, mixing time 10 seconds. After addition and mixing of the compositions zeta potential was determined by using Mütek SZP-06 device. The results of the zeta potential measurement are illustrated in FIG. 1.

It can be seen from FIG. 1 that it is possible to use a large dose of Composition 1 comprising polyvinylamine having hydrolysis degree of 21% before the zero level of zeta potential is reached. When using Reference Compositions 1 and 2, comprising polyvinylamine having hydrolysis degree of 55% and 95%, respectively, the zero level of zeta potential is reached with significantly smaller dosages. The runnability and/or retention of paper machine is known to suffer when the zeta potential of the stock is around zero or positive. Composition 1 according to the invention provides for use of high chemical dosages, which may improve the drainage and strength of the web, without runnability and/or retention problems.

Example 6: Effect on Dry Strength of Produced Paper

Commercial Central European Old Corrugated Container (OCC) stock from Central Europe was used as raw material in Example 6.

OCC was disintegrated from bales by using Andritz laboratory refiner for 35 minutes with open fillings. The bales were disintegrated with mill water to achieve consistency of 2.3% for the test stock suspension. The properties of the disintegrated OCC stock and mill water are shown in annexed Table 8.

The papermaking agent compositions were dosed into the disintegrated OCC stock. Fresh mill water was used as process water which was fed into a mixing tank with the stock under agitation, the stock was diluted to headbox consistency of 1%, and the thin stock suspension was fed to a headbox of a pilot paper machine. The used retention aids were C-PAM, dosage of 100 g/ton of dry product, and colloidal silica, dosage of 200 g/ton of dry product. C-PAM and colloidal silica have been defined above. C-PAM was added before the headbox pump of the pilot paper machine, whereas silica was dosed before the headbox of the pilot paper machine.

OCC liner and fluting sheets having basis weight of 100 g/m² were produced on a pilot paper machine. Operational parameters of the pilot paper machine were as follows:

Running speed: 2 m/min; Web width: 0.32 m; Rotation speed of holey roll: 120 rpm; Press section: 2 nips; Drying section: 8 pre-drying cylinders, baby cylinder, 5 drying cylinders Before testing of strength properties of the produced liner and fluting sheets, the sheets were pre-conditioned for 24 h at 23° C. in 50% relative humidity according to standard ISO 187. Devices and standards, which were used to measure the properties of the sheets, are given in annexed Table 9.

The results for strength property tests are given in annexed Table 10. The results in Table 10 were indexed and compensated to the same ash content in order to make a representative comparison between the tested compositions. Tensile and SCT measurements were indexed by dividing each obtained measurement value by basis weight of the measured sheet and then calculated as geometrical mean of machine direction strength and cross direction strength. The results were leveled to 16% ash content. The results were interpolated to 16% ash content based on the known data points. A difference of +1% unit in ash content corresponds to the difference of −0.25 Nm/g in the geometrical SCT index and to the difference of −0.75 Nm/g in the geometrical tensile index.

It can be seen from results in Table 10 that Composition 1 comprising polyvinylamine having hydrolysis degree of 21% has a positive effect on SCT strength and tensile strength values in comparison to reference compositions.

Example 7: Effect on Beta Formation

Commercial Central European Old Corrugated Container (OCC) stock from Germany was used as raw material in Example 7. Stock had been separated into long fibre (LF-) fraction and short fibre (SF-) fraction by the screen fractionation process already at the mill. Both stock fractions were characterized, results are shown in annexed Table 11.

Used C-PAM and A-PAM have been defined above. The chemicals were added to the stock in a mixing jar under mixing with 700 rpm in the following sequence: 1) cationic polymer/composition, allowed reaction time 2 min, and 2) anionic polymer, allowed reaction time 1 min. After last chemical addition the mixing was continued for 1 min, a determined volume of thin stock was poured into the jar in order to keep the basis weight of the sheets constant (120 g/m²) and mixed at 1500 rpm for 30 s until the stock suspension was ready for the sheet formation.

For the preparation of laboratory sheets the stock was diluted to 1% consistency with clear filtrate (CF). Handsheets having basis weight of 120 g/m² were formed by using Rapid Köthen sheet former with circulation water in accordance with ISO 5269-2:2012. The basis weight of the sheets was adjusted by the volume of the thin stock and the amount of stock portion (240 ml) was kept constant. The sheets were dried in vacuum dryers for 6 minutes at 92° C. and at 1000 mbar.

The used circulation water was prepared in a separate container, where the conductivity and hardness of tap water were adjusted with $CaCl_2$ and NaCl to correspond white water of a paper mill.

Figure 2:
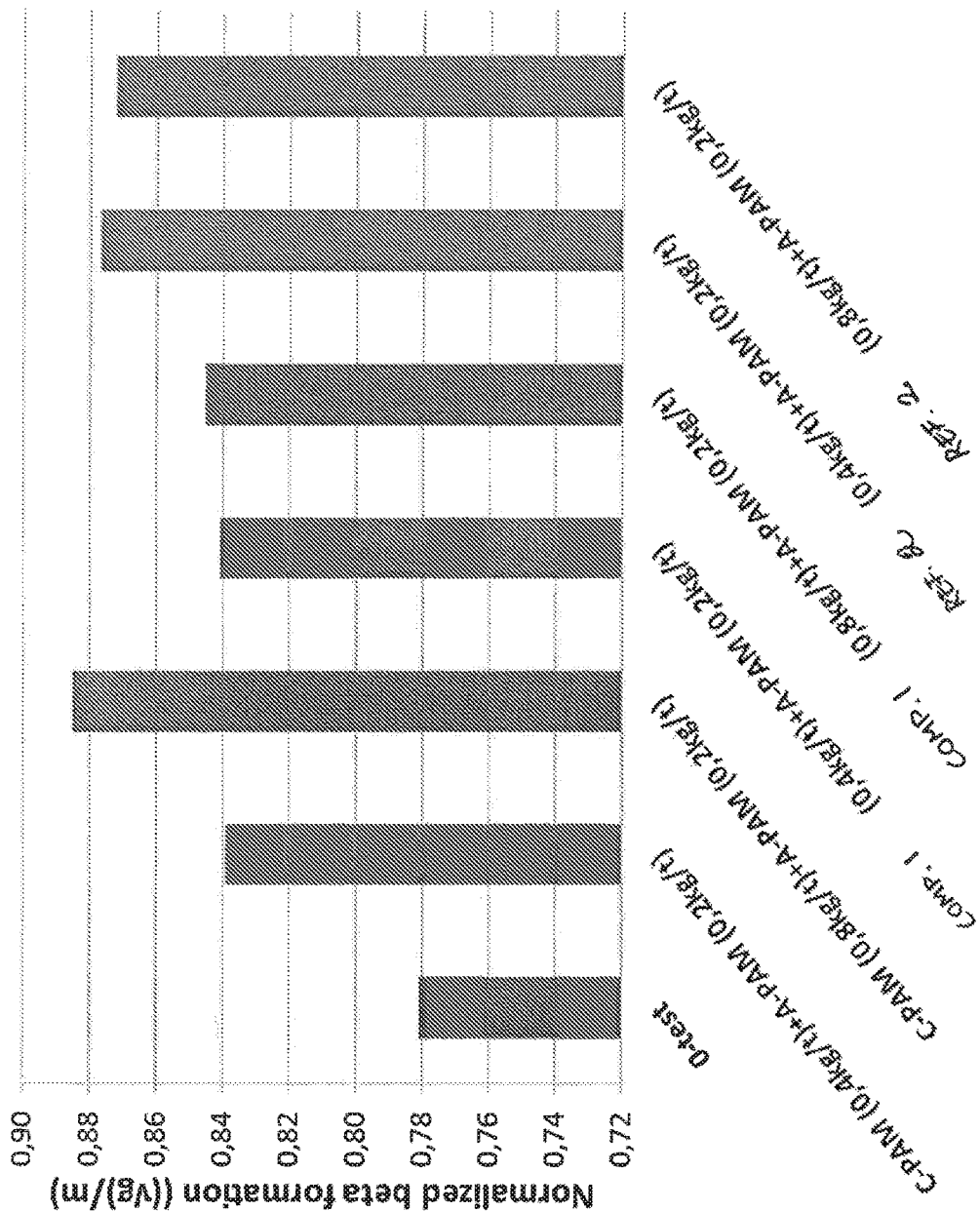
FIG. 2: Normalized beta formation.

Before testing the laboratory sheets were pre-conditioned for 24 h at 23° C. in 50 relative humidity, according to ISO 187. Basis weight was determined by using Mettler Toledo weighing apparatus, according to with ISO 536. Formation of the laboratory sheets was studied by using AMBERTEC Beta Formation tester according to standard SCAN-P 92:09. The formation result of each sheet was divided by the square root of the basis weight of the sheet in order to obtain normalized beta formation value for the sheets. FIG. 2 shows the normalized beta formation results of Example 7 for the short fiber pulp handsheets.

Low value beta formation values are preferred. From FIG. 2 it can be seen that Composition 1 comprising polyvinylamine having hydrolysis degree of 21 performs better than Reference 2 comprising polyvinylamine having hydrolysis degree of 55%.

Example 8: Drainage Test

Same stock as in Example 7 was used in Example 8. The following dilution ratio was used: two parts of the long fibre fraction and one proportion of thin stock. The stock was diluted to 4.2 g/l consistency with the conductivity adjusted tap water.

Drainage results were obtained by using the DDA, as described earlier, except that the sample stock was mixed with the stirrer at 1200 rpm, instead of 1500 rpm, for 30 seconds.

The drainage results are shown in annexed Table 12. From Table 12 it is seen that Composition 1 comprising polyvinylamine having hydrolysis degree of 21 provides clear improvement in drainage compared Reference 1, 2 and 3. Also Composition 2 performs well at dose level of 1.2 kg/ton and together with A-PAM.

Example 9: Effect on Burst Index

Commercial European OCC stock was used for preparation of laboratory sheets. The stock was diluted to a consistency of 8.8 g/l with clear filtrate (CF). Properties of OCC stock, clear filtrate and white water are given in annexed Table 13.

Tested compositions were added to the stock in a mixing jar under mixing with 1500 rpm in the following sequence: 1) test composition, added after 10 s from the start of the mixing, 2) a predetermined volume of the white water after 15 s from the start of the mixing, 3) colloidal silica particles after 20 s from the start of the mixing. After 30 s from the start of the mixing, handsheets having basis weight of 120 g/m² were formed by using Rapid Köthen sheet former with circulation water in accordance with ISO 5269-2:2012. The basis weight of the sheets was adjusted by the volume of the white water and the amount stock portion (440 ml) was kept constant.

The used circulation water was prepared in a separate container, where the conductivity and hardness of tap water were adjusted with $CaCl_2$ and NaCl to correspond white water of a paper mill.

The formed sheets were dried in a vacuum dryer for 6 minutes at temperature of 92° C. and at pressure of 1000 mbar.

Before testing the laboratory sheets were pre-conditioned for 24 h at 23° C. in 50 relative humidity, according to ISO 187. Basis weight was determined by using Mettler Toledo weighing apparatus, according to ISO 536. Burst strength was measured by using L&W Bursting Strength tester, according to ISO 2758. The obtained were indexed and compensated to the same ash content in order to make a representative comparison between tested compositions. The results were leveled to 17% ash content. A difference of +1% unit in ash content corresponds to the difference of −0.05 kPa*m²/g in the burst index. The results of Example 9 are shown in annexed Table 14. It is seen from Table 14 that Composition 1 has the best improvement effect on the burst index of the laboratory sheet compared with Reference 0 and Reference 1.

Even if the invention was described with reference to what at present seems to be the most practical and preferred embodiments, it is appreciated that the invention shall not be limited to the embodiments described above, but the invention is intended to cover also different modifications and equivalent technical solutions within the scope of the enclosed claims.

TABLE 1

Definitions of papermaking agent compositions comprising water-soluble polymers that are used in the Examples.

| | Hydrolysis degree of water-soluble polymer [mol-%] | Molecular weight [g/mol] | Active polymer content of dry composition [%] | Viscosity [mPas] |
|---|---|---|---|---|
| Composition 1 | 21 | ~4,000,000 | 71 | 4400 |
| Composition 2 | 23 | ~4,000,000 | 67 | 733 |
| Composition 3 | 35 | ~4,000,000 | 59 | 633 |
| Reference 0 | 10 | ~4,000,000 | 83 | — |
| Reference 1 | 40 | ~4,000,000 | 74 | 3300 |
| Reference 2 | 55 | ~4,000,000 | 48 | 1670 |
| Reference 3 | 90 | ~4,000,000 | 36 | 507 |
| Reference 4 | 44 | ~300,000 | 53 | 23 |

TABLE 2

Properties of LF- and SF-fractions, thin stock and clear filtrate used in Example 1.

| Property | LF-fraction | SF-fraction | Thin stock | CF | Device/standard |
|---|---|---|---|---|---|
| pH | 6.2 | 6.3 | 6.8 | 6.7 | Knick Portamess 911 |
| Turbidity (NTU) | 2760 | 2478 | 866 | 490 | WTW Turb 555IR |
| Conductivity (mS/cm) | 4.0 | 4.0 | 2.9 | 2.7 | Knick Portamess 911 |
| Charge (μekv/l) | −105.5 | −89.8 | −71.1 | −90.9 | Mütek PCD 03 |
| Zeta potential (mV) | −1.5 | −1.4 | — | — | Mütek SZP-06 |
| Consistency (g/l) | 38.6 | 38.5 | 14.0 | — | ISO 4119 |
| Ash content (%) | 14.5 | 16.3 | 25.1 | — | ISO 1762 |
| Fines content (%) | 20 | 24 | — | — | SCAN-CM 66:05 |

TABLE 3

Drainage and retention results of Example 1.

| | Dosing time [s] | | | | Drainage and Retention Results | |
|---|---|---|---|---|---|---|
| | −10 | | −5 | | Drainage | First-pass |
| Test No | Composition name | Dose [kg/ton] | A-PAM Dosage [kg/ton] | | Time [s] | Rate [%] |
| 1 | — | — | — | | 6.8 | 91.95 |
| 2 | — | — | 0.2 | | 6.98 | 93.02 |
| 3 | Composition 1 | 0.4 | 0.2 | | 4.06 | 97.27 |
| 4 | Composition 1 | 0.8 | 0.2 | | 3.53 | 99.30 |
| 5 | Composition 1 | 1.2 | 0.2 | | 3.17 | 99.63 |
| 6 | Reference 2 | 0.4 | 0.2 | | 5.63 | 95.07 |
| 7 | Reference 2 | 0.8 | 0.2 | | 5.39 | 94.47 |
| 8 | Reference 2 | 1.2 | 0.2 | | 5.44 | 94.80 |
| 9 | Reference 3 | 0.4 | 0.2 | | 5.83 | 93.75 |
| 10 | Reference 3 | 0.8 | 0.2 | | 5.22 | 93.71 |
| 11 | Reference 3 | 1.2 | 0.2 | | 5.53 | 93.65 |

TABLE 4

Drainage and retention results of Example 2.

| | Dosing Time [s] | | −15 | −10 | Drainage and Retention Results | |
|---|---|---|---|---|---|---|
| Test No | Composition name | Dose [kg/ton] | C-PAM Dosage [kg/ton] | Bentonite Dosage [kg/ton] | Drainage Time [s] | First-pass Rate [%] |
| 12 | — | — | 0.2 | 1.5 | 7.08 | 91.07 |
| 13 | Composition 1 | 0.4 | 0.2 | 1.5 | 4.93 | 92.37 |
| 14 | Composition 1 | 0.8 | 0.2 | 1.5 | 3.48 | 93.10 |
| 15 | Composition 1 | 1.2 | 0.2 | 1.5 | 2.76 | 96.30 |
| 16 | Reference 2 | 0.4 | 0.2 | 1.5 | 6.79 | 90.03 |
| 17 | Reference 2 | 0.8 | 0.2 | 1.5 | 6.81 | 90.80 |
| 18 | Reference 3 | 0.4 | 0.2 | 1.5 | 6.99 | 90.77 |
| 19 | Reference 3 | 0.8 | 0.2 | 1.5 | 6.96 | 90.50 |

TABLE 5

Drainage test results of Example 3 with recirculated DDA filtrate.

| Dosing time [s] | | −15 | | Results for Drainage and Filtrate Charge | |
| --- | --- | --- | --- | --- | --- |
| Number of circulations | Composition name | | kg/ton [active] | Drainage [s] | Charge [µekv/l] |
| 0 | — | | 0 | 12 | −195 |
| 1 | Composition 1 | | 0.8 | 10.4 | −75 |
| 1 | Composition 3 | | 0.8 | 11.3 | −74 |
| 1 | Reference 2 | | 0.8 | 12.4 | −91 |
| 1 | Reference 3 | | 0.8 | 12 | −87 |
| 3 | Composition 1 | | 0.8 | 6.3 | −51 |
| 3 | Composition 3 | | 0.8 | 7.21 | −49 |
| 3 | Reference 2 | | 0.8 | 10 | −75 |
| 3 | Reference 3 | | 0.8 | 11.3 | −91 |
| 5 | Composition 1 | | 0.8 | 5.7 | −51 |
| 5 | Composition 3 | | 0.8 | 6.3 | −45 |
| 5 | Reference 2 | | 0.8 | 8.8 | −36 |
| 5 | Reference 3 | | 0.8 | 10.8 | −55 |
| 7 | Composition 1 | | 0.8 | 5.9 | −52 |
| 7 | Composition 3 | | 0.8 | 6.2 | −38 |
| 7 | Reference 2 | | 0.8 | 8.3 | −38 |
| 7 | Reference 3 | | 0.8 | 10.1 | −42 |

TABLE 6

Properties of OCC stock and white water used in Example 4.

| Property | OCC stock | White Water | Device/Standard |
| --- | --- | --- | --- |
| pH | 6.7 | 6.9 | Knick Portamess 911 |
| Turbidity (NTU) | 431 | 23 | WTW Turb 555IR |
| Conductivity (mS/cm) | 3.3 | 1.6 | Knick Portamess 911 |
| Charge (µekv/l) | −213 | −62 | Mütek PCD 03 |
| Zeta potential (mV) | −9 | — | Mütek SZP-06 |
| Consistency (g/l) | 46 | 1 | ISO 4119 |
| Ash content (%) | 14 | 31 | ISO 1762 |

TABLE 7

Drainage test results of Example 4.

| Dosing time [s] Test No | Composition Name | −15 Dose [kg/ton] | −10 A-PAM Dosage [kg/ton] | Drainage Results Drainage [s] |
| --- | --- | --- | --- | --- |
| 1 | — | — | — | 11.45 |
| 2 | Composition 1 | 0.4 | — | 8.56 |
| 3 | Composition 2 | 0.4 | — | 8.43 |
| 4 | Composition 3 | 0.4 | — | 9.10 |
| 5 | Reference 1 | 0.4 | — | 9.25 |
| 6 | Composition 1 | 0.8 | — | 7.51 |
| 7 | Composition 2 | 0.8 | — | 7.14 |
| 8 | Composition 3 | 0.8 | — | 8.13 |
| 9 | Reference 1 | 0.8 | — | 8.49 |
| 10 | Reference 2 | 0.8 | — | 8.98 |
| 11 | Reference 3 | 0.8 | — | 9.52 |
| 12 | Composition 1 | 0.8 | 0.07 | 7.23 |
| 13 | Composition 2 | 0.8 | 0.07 | 7.12 |
| 14 | Composition 3 | 0.8 | 0.07 | 7.85 |
| 15 | Reference 1 | 0.8 | 0.07 | 7.98 |
| 16 | Reference 2 | 0.8 | 0.07 | 8.29 |
| 17 | Reference 3 | 0.8 | 0.07 | 9.13 |

TABLE 8

Properties of disintegrated OCC stock and mill water in Example 6.

| Property | Disintegrated OCC stock | Mill water | Device/standard |
| --- | --- | --- | --- |
| pH | — | 7.5 | Knick Portamess 911 |
| Conductivity | 1.9 | 2.5 | Knick Portamess 911 |
| Charge | −262 | −283 | Mütek PCD 03 |
| Zeta potential | −8.7 | — | Mütek SZP-06 |
| Consistency | 23 | — | ISO 4119 |
| Ca-content (mg/l) | — | 643 | ISO 777 |
| Alkanity (mmol/l) | — | 2.2 | ISO 9963 |
| COD (mg/l) | 1013 | 630 | ISO 6060 |

TABLE 9

Sheet testing devices and standards in Example 6.

| Measurement | Device | Standard |
| --- | --- | --- |
| Basis weight | Mettler Toledo | ISO 536 |
| SCT (Short Span Compression test) | Lorentzen & Wettre Compression Strength tester | ISO 9895 |
| Tensile strength | Lorentzen & Wettre Tensile tester | ISO 1924-3 |

TABLE 10

Results of Example 6.

| Composition Name | Composition Dose [kg/ton] | SCT Geom. ind. [kNm/kg] | Tensile Geom. ind. [Nm/g] |
| --- | --- | --- | --- |
| — | — | 21.0 | 35.3 |
| Composition 1 | 0.5 | 24.4 | 42.1 |
| Reference 1 | 0.5 | 21.7 | 37.4 |
| Reference 4 | 0.5 | 22.7 | 37.2 |

TABLE 11

Properties of LF- and SF-fractions, thin stock and clear filtrate (CF) used in Example 7.

| Property | LF-fraction | SF-fraction | Thin stock | CF | Device/standard |
| --- | --- | --- | --- | --- | --- |
| pH | 6.3 | 6.2 | 6.9 | 6.3 | Knick Portamess 911 |
| Turbidity (NTU) | 2477 | 2280 | 1236 | 517 | WTW Turb 555IR |
| Conductivity (mS/cm) | 3.8 | 3.7 | 2.3 | 2.3 | Knick Portamess 911 |
| Charge (µekv/l) | −195.3 | −122.7 | −94.7 | −103.1 | Mütek PCD 03 |
| Zeta potential (mV) | −6.8 | −6.2 | — | — | Mütek SZP-06 |
| Consistency (g/l) | 46.6 | 41.2 | 17.1 | — | ISO 4119 |
| Ash content (%) | 14.9 | 16.4 | 23.3 | — | ISO 1762 |
| Ca content (mg/l) | 1144 | 1090 | 519 | 521 | ISO 777 |

TABLE 12

Drainage results for Example 8.

| Dosing time [s] Test No | −10 Composition Name | Dose [kg/ton] | −5 A-PAM Dosage [kg/ton] | Drainage Results Drainage [s] |
|---|---|---|---|---|
| 1 | — | — | — | 6.57 |
| 2 | Reference 0 | 0.8 | — | 4.38 |
| 3 | Composition 1 | 0.8 | — | 3.97 |
| 4 | Composition 2 | 0.8 | — | 4.06 |
| 5 | Composition 3 | 0.8 | — | 4.51 |
| 6 | Reference 1 | 0.8 | — | 4.26 |
| 7 | Reference 2 | 0.8 | — | 4.98 |
| 8 | Reference 3 | 0.8 | — | 5.8 |
| 9 | Reference 0 | 1.2 | — | 4.68 |
| 10 | Composition 1 | 1.2 | — | 3.42 |
| 11 | Composition 2 | 1.2 | — | 3.4 |
| 12 | Composition 3 | 1.2 | — | 3.65 |
| 13 | Reference 1 | 1.2 | — | 4.4 |
| 14 | Reference 0 | 0.8 | A-PAM 0.07 | 4.4 |
| 15 | Composition 1 | 0.8 | A-PAM 0.07 | 4.02 |
| 16 | Composition 2 | 0.8 | A-PAM 0.07 | 4.0 |
| 17 | Composition 3 | 0.8 | A-PAM 0.07 | 4.52 |
| 18 | Reference 1 | 0.8 | A-PAM 0.07 | 4.23 |
| 19 | Reference 2 | 0.8 | A-PAM 0.07 | 4.74 |
| 20 | Reference 3 | 0.8 | A-PAM 0.07 | 5.2 |

TABLE 13

Properties of the OCC stock, white water and clear filtrate used in Example 9.

| Property | OCC | White Water | CF | Device/Standard |
|---|---|---|---|---|
| pH | 6.4 | 6.5 | 5.4 | Knick Portamess 911 |
| Turbidity (NTU) | 97 | 83 | 21 | WTW Turb 555IR |
| Conductivity (mS/cm) | 3.6 | 3 | 2 | Knick Portamess 911 |
| Charge (µekv/l) | −120 | −66 | −48 | Mütek PCD 03 |
| Zeta potential (mV) | −7.8 | — | — | Mütek SZP-06 |
| Consistency (g/l) | 33.8 | 3.3 | — | ISO 4119 |
| Ash content (%) | 19.2 | 48.8 | — | ISO 1762 |

TABLE 14

Results of Example 9.

| Composition Name | Dose [kg/ton] | Burst index [kPa*m²/g] |
|---|---|---|
| — | 0 | 1.39 |
| Reference 0 | 0.5 | 1.45 |
| Composition 1 | 0.5 | 1.49 |
| Reference 1 | 0.5 | 1.39 |

The invention claimed is:

1. A method for treating of fibre stock in manufacture of paper, board or the like, for increasing dewatering of the stock and at least one strength property of produced fibrous web, the method comprising
   obtaining a thick fibre stock,
   diluting the thick fibre stock to a thin fibre stock having a consistency <3% by addition of water,
   draining the thin fibre stock and forming a continuous fibrous web,
   wherein a papermaking agent composition, which comprises a water-soluble polymer, comprising 21-39 mol-% of vinylamine units and having an average molecular weight of at least 1 000 000 Da is added to the thick fiber stock or to the thin fibre stock.

2. The method according to claim 1, wherein the papermaking agent composition comprises a water-soluble polymer comprising 21-30 mol-%, of vinylamine units.

3. The method according to claim 1 wherein in adding papermaking agent composition comprising water-soluble polymer comprising vinylamine units to the thick fibre stock the thick stock is diluted with short loop white water of the paper or board machine before the web formation.

4. The method according to claim 1, wherein in adding papermaking agent composition comprising water-soluble polymer comprising vinylamine units to the thin fibre stock after last shear stages and before headbox.

5. The method according to claim 1, wherein a cationic copolymer of acrylamide is added to the fiber stock, preferably sequentially, with the papermaking agent composition comprising water-soluble polymer comprising vinylamine units.

6. The method according to claim 1, wherein an anionic copolymer of acrylamide or microparticles or both of them are added to the fibre stock, preferably after the addition of the papermaking agent composition comprising water-soluble polymer comprising vinylamine units.

7. The method according to claim 1, wherein the fibre stock comprises fibres originating from recycled paper, old corrugated containerboard (OCC), unbleached kraft pulp, neutral sulphite semi chemical (NCCS) pulp and/or mechanical pulp.

8. The method according to claim 1, wherein the fibre stock comprises at least 80% recycled fibres.

9. The method according to claim 1, wherein the papermaking agent composition comprising polymer comprising vinylamine units is added to the thick fibre stock in such amount of that the amount of the said polymer is 50-1500 g/ton produced paper.

10. The method according to claim 1, wherein before the addition of the papermaking agent composition to the fibre stock zeta-potential of the fibre stock is −15--1 mV.

11. The method according to claim 1, wherein after the addition of the papermaking composition comprising polymer comprising vinylamine units to the fibre stock zeta-potential of the fibre stock is <0 mV.

12. The method according to claim 1, wherein after the addition of the papermaking agent composition and optional other additives charge density of the fibre stock in headbox is at the most 300 µeq/l, higher than the charge density of the fibre thick stock before the addition.

* * * * *